United States Patent
Fujino et al.

(10) Patent No.: US 12,523,532 B2
(45) Date of Patent: Jan. 13, 2026

(54) RADIATION THERMOMETER, TEMPERATURE MEASUREMENT METHOD, AND TEMPERATURE MEASUREMENT PROGRAM

(71) Applicant: HORIBA, Ltd., Kyoto (JP)

(72) Inventors: Sho Fujino, Kyoto (JP); Naoyuki Matsumoto, Kyoto (JP); Yasuo Furukawa, Kyoto (JP)

(73) Assignee: HORIBA, Ltd., Kyoto (JP)

( * ) Notice: Subject to any disclaimer, the term of this patent is extended or adjusted under 35 U.S.C. 154(b) by 151 days.

(21) Appl. No.: 17/770,736

(22) PCT Filed: Oct. 23, 2020

(86) PCT No.: PCT/JP2020/039962
§ 371 (c)(1),
(2) Date: Apr. 21, 2022

(87) PCT Pub. No.: WO2021/080002
PCT Pub. Date: Apr. 29, 2021

(65) Prior Publication Data
US 2022/0364930 A1    Nov. 17, 2022

(30) Foreign Application Priority Data

Oct. 25, 2019 (JP) .................. 2019-194134
Apr. 10, 2020 (JP) .................. 2020-071243

(51) Int. Cl.
*G01J 5/12* (2006.01)
*G01J 5/07* (2022.01)
*G01J 5/0831* (2022.01)

(52) U.S. Cl.
CPC . *G01J 5/12* (2013.01); *G01J 5/07* (2022.01); *G01J 5/0831* (2013.01)

(58) Field of Classification Search
CPC .... G01J 5/12; G01J 5/0831; G01J 5/07; G01J 5/0871; G01J 5/80; G01J 5/0802
See application file for complete search history.

(56) References Cited

U.S. PATENT DOCUMENTS

| 5,249,142 A | * | 9/1993 | Shirakawa | ............... G01J 5/60 |
| | | | | 250/339.04 |
| 2014/0109389 A1 | * | 4/2014 | Okamura | ............... B65B 15/04 |
| | | | | 250/340 |

(Continued)

FOREIGN PATENT DOCUMENTS

| JP | S61231422 A | * 10/1986 | ............. G01J 5/601 |
| JP | S62106328 A | 5/1987 | |

(Continued)

OTHER PUBLICATIONS

ISA Japan Patent Office, International Search Report Issued in Application No. PCT/JP2020/039962, Jan. 12, 2021, WIPO, 7 pages.

(Continued)

*Primary Examiner* — David P Porta
*Assistant Examiner* — Gisselle M Gutierrez
(74) *Attorney, Agent, or Firm* — Alleman Hall & Tuttle LLP

(57) ABSTRACT

A radiation thermometer includes two infrared detectors and a temperature calculator. The infrared detectors each have a predetermined measurement visual field and detect the amount of infrared rays incident from the measurement visual field. The temperature calculator calculates the temperature of a measurement target region based on the amounts of infrared rays detected by the respective infrared detectors. The measurement target region is included in the measurement visual fields of the respective infrared detectors, and the sizes of the respective measurement visual (Continued)

fields are set to be different from each other with respect to the measurement target region.

12 Claims, 12 Drawing Sheets

(56) References Cited

U.S. PATENT DOCUMENTS

| | | | |
|---|---|---|---|
| 2017/0241843 A1* | 8/2017 | Jeon | G01P 13/00 |
| 2024/0110834 A1* | 4/2024 | Fujino | G01J 5/806 |

FOREIGN PATENT DOCUMENTS

| | | | | |
|---|---|---|---|---|
| JP | S6375629 A * | 4/1988 | | G01J 5/62 |
| JP | S63075629 A | 4/1988 | | |
| JP | S63285429 A | 11/1988 | | |
| JP | H0756471 B2 * | 6/1995 | | G01J 5/0022 |
| JP | H08320258 A | 12/1996 | | |
| JP | H10038696 A | 2/1998 | | |
| JP | 2001-249050 A | 9/2001 | | |
| JP | 2002188962 A | 7/2002 | | |
| JP | 2005-207997 A | 8/2005 | | |
| JP | 2007-183207 A | 7/2007 | | |
| JP | 2013200137 A | 10/2013 | | |
| JP | 2014169924 A | 9/2014 | | |
| WO | 2010/025228 A2 | 3/2010 | | |

OTHER PUBLICATIONS

Japan Patent Office, Office Action Issued in Application No. 2021-553573, Dec. 3, 2024, 8 pages.

* cited by examiner

RADIATION THERMOMETER, TEMPERATURE MEASUREMENT METHOD, AND TEMPERATURE MEASUREMENT PROGRAM

FIELD

The present invention relates to a non-contact radiation thermometer or the like that receives infrared rays emitted from a measurement target region by an infrared sensor (e.g., a thermopile) and measures the temperature of the measurement target region using the amount of received infrared rays.

BACKGROUND

If a measurement visual field corresponding to a measurement area of this type of radiation thermometer includes not only the measurement target region but also the background of the measurement target, or another member partially overlapping the measurement visual field is present between the measurement target region and the radiation thermometer (causing lack of the visual field), the infrared sensor receives not only infrared rays emitted from the measurement target region but also infrared rays emitted from non-target objects, such as the background and another member. Thus, there is the problem that the temperature of the measurement target region cannot be measured accurately.

Patent Literature 1, for example, employs a method of measuring in advance the temperature of non-target objects and the ratio of the area occupied by the non-target objects to the measurement visual field and eliminating the effects of the temperature of the non-target objects from the temperature measured by the infrared sensor. This configuration, however, requires time and effort in adjustment before the measurement and eventually results in an error in measurement if the temperature of the non-target objects changes.

To avoid this, there is a method of narrowing the measurement visual field by, for example, adjusting an optical system disposed in front of the infrared sensor to include only the measurement target region in the measurement visual field.

This method, however, cannot meet a demand exceeding the limit of adjustment of the visual field, like when the size of the measurement target region is very small or when the measurement target region is set at the bottom of a deep hole.

In addition, if there are infrared rays that are emitted from the background, passing through the measurement target region, and incident on the infrared sensor, the infrared rays have bad effects on the accuracy in measuring the temperature of the measurement target region even when only the measurement target region is included in the measurement visual field. In particular, if a measurement target object has low emissivity (high transmittance) in a measurement infrared wavelength band, the amount of infrared rays passing through the measurement target region increases, so that the accuracy in measuring the temperature significantly deteriorates.

CITATION LIST

Patent Literature

Patent Literature 1: Japanese Patent Application Laid-open No. S62-106328

SUMMARY

Technical Problem

The present invention has been made in view of the problems described above, and a main object thereof is to provide a radiation thermometer that can accurately measure the temperature of a measurement target region by canceling effects of infrared rays incident from a non-target object other than a measurement target object.

More specifically, an object of the present invention is to reliably eliminate effects of a non-target object other than the measurement target region if the non-target object is present in a measurement visual field, and the temperature of the non-target object changes. Alternatively, an object of the present invention is to reliably eliminate effects of a non-target object that emits infrared rays passing through the measurement visual field if the non-target object is present in the background of the measurement target region and the temperature of the non-target object changes.

Solution To Problem

A radiation thermometer according to the present invention measures a temperature of a measurement target region in an object by infrared rays emitted from the measurement target region and includes:

two infrared detectors each having a predetermined measurement visual field and configured to detect an amount of infrared rays incident from the measurement visual field; and a temperature calculator configured to calculate the temperature of the measurement target region based on the amounts of infrared rays detected by the respective infrared detectors, and the measurement target region is included in the measurement visual fields of the respective infrared detectors, and the sizes of the respective measurement visual fields are set to be different from each other with respect to the measurement target region.

With this configuration, the two infrared detectors each detecting the amount of infrared rays from the same measurement target region and different amounts of infrared rays from other regions are used, and therefore, if the ratio of the measurement target region to the measurement visual field of each of the infrared detectors is known, for example, the radiation thermometer can cancel the effects of the temperature of the other regions and determine the amount of infrared rays from the measurement target region. In addition, the radiation thermometer can accurately measure the temperature without being affected by a temporal change in temperature of the other regions and a positional temperature gradient, for example, because it can cancel the effects of the temperature of the other regions.

In a specific aspect to make the sizes of the measurement visual fields different with respect to the measurement target region, the infrared detectors each include an infrared sensor and an optical system disposed in front of the infrared sensor and configured to define a viewing angle that is a solid angle of the infrared rays incident on the infrared sensor, distances between the respective infrared detectors and the measurement target region are set to be equal to each other, and the viewing angles of the respective infrared detectors are set to be different from each other.

In another specific aspect, the viewing angles of the respective infrared detectors are set to be equal to each other, and the distances between the respective infrared detectors and the measurement target region are set to be different from each other.

The present invention may be a temperature measurement method for measuring a temperature of a measurement target region in an object in a non-contact manner, the method including:

setting a first measurement visual field including the measurement target region and detecting an amount of infrared rays incident from the first measurement visual field;

setting a second measurement visual field including the measurement target region and having a size different from the size of the first measurement visual field with respect to the measurement target region, and detecting an amount of infrared rays incident from the second measurement visual field; and calculating the temperature of the measurement target region based on the amounts of infrared rays.

The present invention may be a temperature measurement program used to measure a temperature of a measurement target region in an object in a non-contact manner, the program causing a computer to implement a function as a temperature calculator configured to calculate the temperature of the measurement target region based on an amount of infrared rays detected by a first infrared detector having a first measurement visual field including the measurement target region and on an amount of infrared rays detected by a second infrared detector having a second measurement visual field including the measurement target region and having a size different from the size of the first measurement visual field with respect to the measurement target region.

To reliably eliminate effects of a non-target object that emits infrared rays passing through the measurement visual field if the non-target object is present in the background of the measurement target region and the temperature of the non-target object changes, it is preferable that a radiation thermometer include: two infrared detectors each having a predetermined measurement visual field and configured to detect an amount of infrared rays incident from the measurement visual field; and a temperature calculator configured to calculate the temperature of the measurement target region based on the amounts of infrared rays detected by the respective infrared detectors, and detectable infrared wavelength bands detectable by the respective infrared detectors be different from each other.

More specifically, it is preferable that the temperature calculator calculate the temperature of the measurement target region based further on a ratio between emissivity and transmittance of infrared rays in the measurement target region.

A temperature measurement method using the radiation thermometer may include: setting a predetermined measurement visual field including the measurement target region; detecting an amount of infrared rays incident from the measurement visual field in a predetermined first detectable infrared wavelength band and detecting the amount of infrared rays in a second detectable infrared wavelength band different from the first detectable infrared wavelength band; and calculating the temperature of the measurement target region based on the detected amounts of infrared rays.

A temperature measurement program used to measure a temperature of a measurement target region in an object causes a computer to implement a function as a temperature calculator configured to calculate the temperature of the measurement target region based on a first amount of detected infrared rays obtained by detecting an amount of infrared rays incident from a predetermined measurement visual field including the measurement target region in a predetermined first detectable infrared wavelength band and a second amount of detected infrared rays obtained by detecting the amount of infrared rays in a second detectable infrared wavelength band different from the first detectable infrared wavelength band.

To reliably eliminate effects of infrared rays that are emitted from a surrounding region, reflected by a surface of an object, and incident on a radiation thermometer, it is preferable that a radiation thermometer include: two infrared detectors each having a predetermined measurement visual field and configured to detect an amount of infrared rays incident from the measurement visual field; and a temperature calculator configured to calculate the temperature of the measurement target region based on the amounts of infrared rays detected by the respective infrared detectors, the measurement target region be included in the measurement visual fields of the respective infrared detectors and reflectances of infrared rays in the measurement target region of the respective infrared detectors be set to be different from each other.

To vary the reflectance of infrared rays by a simple configuration, the infrared detectors may each have a predetermined measurement optical axis, and angles of the measurement optical axes to a surface of the object may be different from each other.

More specifically, it is preferable that the temperature calculator calculate the temperature of the measurement target region based further on one or both of emissivity and reflectance of infrared rays in the measurement target region.

A temperature measurement method for reliably eliminating effects of infrared rays that are emitted from a surrounding region, reflected by a surface of an object, and incident on an infrared detectors in temperature measurement using a radiation thermometer includes: setting a predetermined measurement visual field including the measurement target region; causing infrared rays to be reflected by the measurement target region with first reflectance and detecting an amount of infrared rays incident from the measurement visual field; causing infrared rays to be reflected by the measurement target region with second reflectance different from the first reflectance and detecting an amount of infrared rays incident from the measurement visual field; and calculating the temperature of the measurement target region based on the detected amounts of infrared rays.

As a simple method for making the reflectance of infrared rays in the measurement target region in detecting infrared rays different, a measurement optical axis may be set to have a first angle to a surface of the object to cause the infrared rays to be reflected by the measurement target region with the first reflectance, and a measurement optical axis may be set to have a second angle different from the first angle to the surface of the object to cause the infrared rays to be reflected by the measurement target region with the second reflectance.

A temperature measurement program used to measure a temperature of a measurement target region in an object causes a computer to implement a function as a temperature calculator configured to calculate the temperature of the measurement target region based on an amount of infrared rays detected in a state in which the measurement optical axis is set to cause the infrared rays to be reflected by the measurement target region with first reflectance and on an amount of infrared rays detected in a state in which the measurement optical axis is set to cause the infrared rays to be reflected by the measurement target region with second reflectance different from the first reflectance.

Advantageous Effects Of Invention

With the radiation thermometer according to the present embodiment having the configurations described above, the temperature of the measurement target region can be accurately measured in a non-contact manner regardless of how much the temperature of regions other than the measurement target region changes.

In addition, even though a non-target object that emits infrared rays passing through the measurement visual field is present in the background of the measurement target and the temperature of the non-target object changes, the effects thereof can be reliably eliminated.

Figure 1:
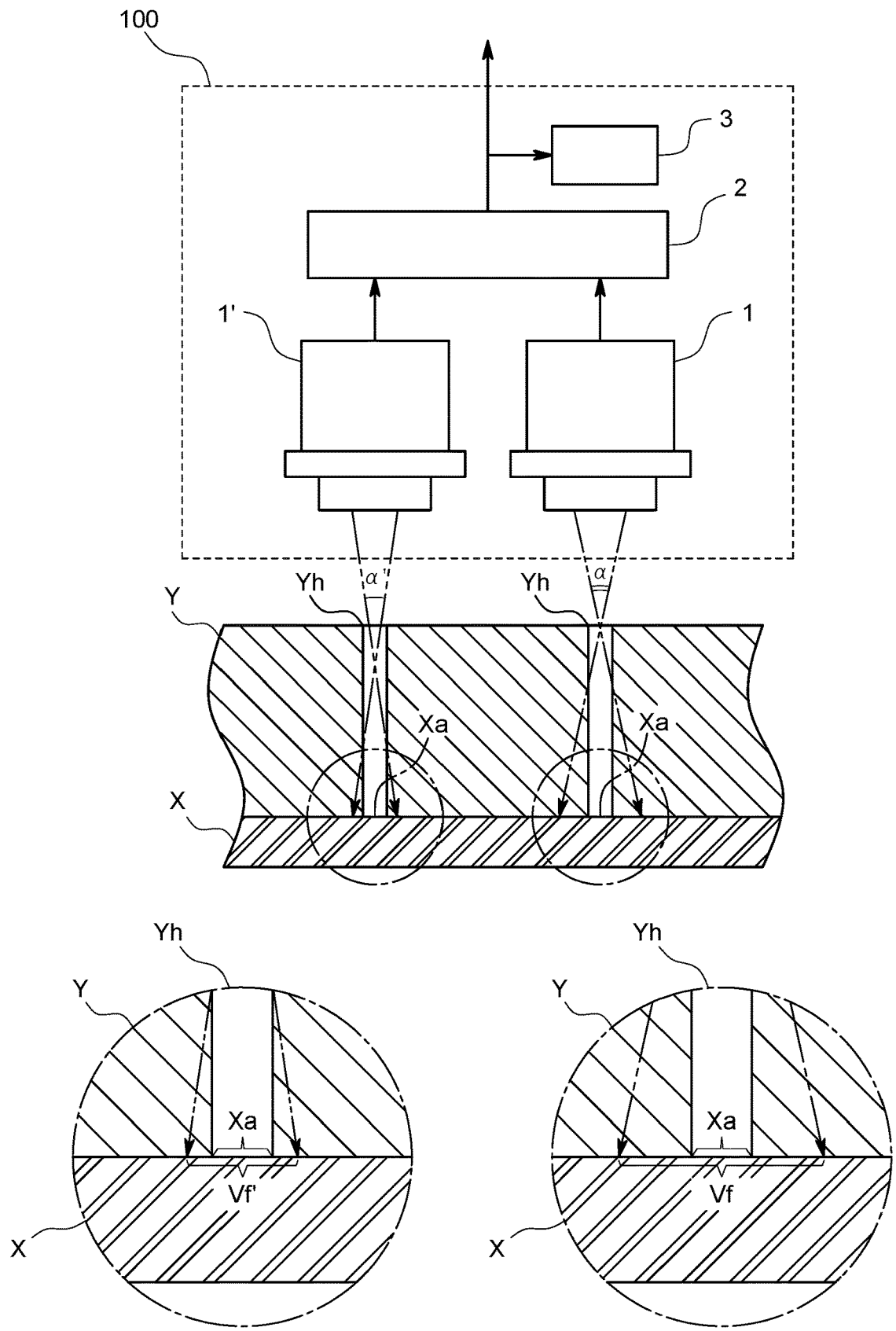
FIG. 1 is an overall schematic of a radiation thermometer according to a first embodiment of the present invention.

LIST OF REFERENCE CHARACTERS 100 radiation thermometer
X object
Xa measurement target region
1, 1' infrared detector
2 temperature calculator
Vf, Vf' measurement visual field
α, α' viewing angle

DESCRIPTION OF EMBODIMENTS

Embodiments of the present invention are described with reference to the accompanying drawings.

First Embodiment

A radiation thermometer 100 according to the present embodiment measures the temperature of a measurement target region Xa in an object X in a non-contact manner as illustrated in FIG. 1. The radiation thermometer 100 is a non-contact thermometer and includes a pair of infrared detectors 1 and 1', a temperature calculator 2, and a temperature display unit 3. The pair of infrared detectors 1 and 1' detects infrared rays emitted from the object X. The temperature calculator 2 calculates the temperature of the measurement target region Xa based on the amounts of infrared rays detected by the respective infrared detectors 1 and 1'.

Before explaining the configuration of the radiation thermometer 100 in detail, the structure of the object X is described first. As illustrated in FIG. 1, the object X has a flat plate shape and is provided with a heat transfer block Y attached to a first surface of the object X to control the temperature of the object X. The radiation thermometer 100 is disposed facing the first surface of the object X and fails to measure the temperature of the object X because the heat transfer block Y obstructs the measurement as it is. To address this, two thin holes Yh having the same diameter are formed in the heat transfer block Y, and the radiation thermometer 100 can measure the temperature of the object X through the thin holes Yh. In other words, the regions exposed through the thin holes Yh in the object X are the measurement target regions Xa.

The object X according to the embodiment does not substantially have a positional temperature gradient. While the thin holes Yh are formed at two positions in the heat transfer block 7, and there are apparently two measurement target regions Xa, these two measurement target regions Xa have substantially the same area, the same shape, and the same temperature. Consequently, these two measurement target regions Xa can be considered as the same measurement target region Xa. Regions surrounding the thin holes Yh in the heat transfer block 7 also have the same temperature, the same shape, and other factors. For this reason, the surrounding conditions of these two measurement target regions Xa can also be considered equal.

In other words, the present embodiment has two measurement target regions Xa substantially equal in all the factors including the surrounding conditions and can consider that the radiation thermometer 100 measures a single measurement target region Xa.

The following describes various units of the radiation thermometer TOO.

Figure 2:
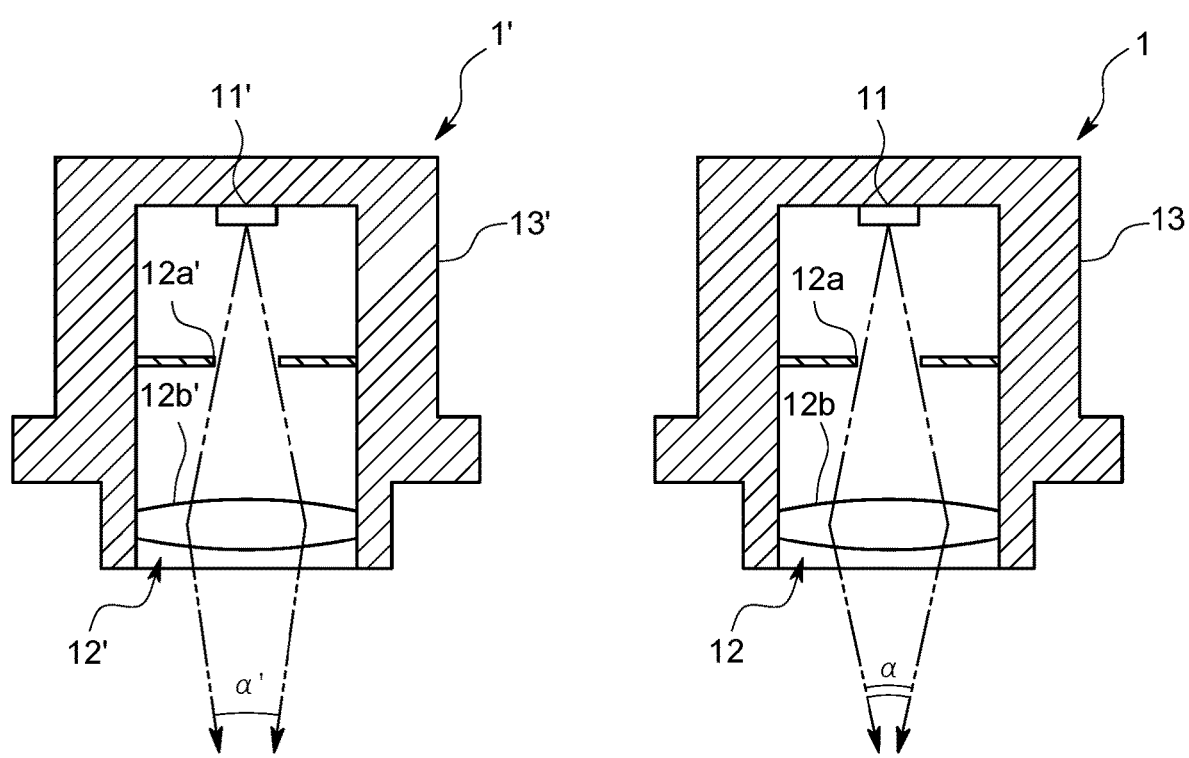
FIG. 2 is a schematic of the internal structure of infrared detectors according to the embodiment.

As illustrated in FIG. 2, the pair of infrared detectors 1 and 1' includes sensor elements 11 and 11', optical systems 12 and 12', and housings 13 and 13', respectively. The sensor elements 11 and 11', such as thermopiles, detect infrared rays. The optical systems 12 and 12' are disposed in front of the sensor elements 11 and 11', respectively. The housings 13 and 13' house the sensor elements 11 and 11' and the optical systems 12 and 12', respectively.

The infrared detectors 1 and 1' are disposed side by side facing the respective thin holes Yh. One infrared detector 1 (first infrared detector 1) receives infrared rays emitted from the measurement target region Xa at the bottom of one thin hole Yh, and the other infrared detector 1' (second infrared detector 1') receives infrared rays emitted from the measurement target region Xa at the bottom of the other thin hole Yh. The distances between the infrared detectors 1 and 1' and the respective measurement target regions Xa are set to be equal.

The sensor elements 11 and 11' are thermal elements that detect a change in temperature caused when absorbing infrared rays as a change in electromotive force. The sensor elements 11 and 11' according to the present embodiment are thermopiles in which a number of thermocouples are disposed in series and formed in thin films. The sensor elements may be other thermal elements, such as porometers and pyroelectric elements, or quantum elements instead of thermal elements may be used.

The optical systems 12 and 12' include lenses 12b and 12b', apertures 12a and 12a', and other components provided in front of the sensor elements 11 and 11', respectively. The optical systems 12 and 12' define solid angles (viewing angles) α and α' of infrared rays incident on the sensor elements 11 and 11' from the outside and eventually define measurement visual fields Vf and Vf', respectively. The measurement visual fields Vf and Vf' of the respective infrared detectors 1 and 1' are each set to include the whole corresponding measurement target region Xa and the surrounding region of the measurement target region Xa.

Consequently, the first infrared detector 1 and the second infrared detector 1' according to the embodiment have different sizes of the measurement visual fields Vf and Vf' with respect to the measurement target region Xa by making only the viewing angles α and α' different. In other words, the first infrared detector 1 and the second infrared detector 1' have different ratios of the area occupied by the measurement target region Xa to the measurement visual fields Vf and Vf'. In this embodiment, for example, only the lens curvature of the optical systems 12 and 12' are different and the other configurations are the same.

Figure 3:
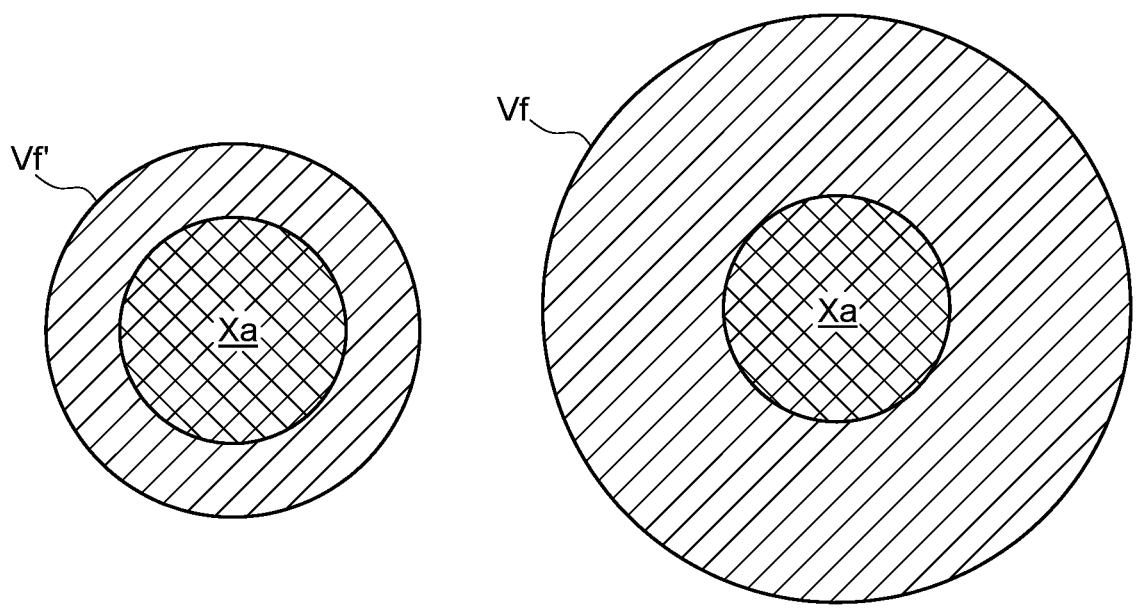
FIG. 3 is a visual field diagram of a measurement target region and other region (non-target object) in a measurement visual field according to the embodiment.

FIG. 3 illustrates the size of each of the measurement visual fields Vf and Vf' with respect to the measurement target region Xa. A region other than the measurement target region Xa in each of the measurement visual fields Vf and Vf' according to the embodiment corresponds to the inner wall of the thin hole Yh as illustrated in FIG. 1. The infrared rays emitted from the inner wall of the thin hole Yh is incident on each of the infrared detectors 1 and 1'.

The temperature calculator 2 includes electric circuits (not illustrated), such as a buffer, an amplifier, an AD converter, a CPU, a memory, and other components. The CPU cooperates with peripheral devices according to a computer program stored in the memory, thereby implementing a function of calculating the temperature of the temperature measurement target region Xa based on the values of detection signals output from the sensor elements 11 and 11'. The temperature calculated by the temperature calculator 2 is output as temperature signals.

The temperature display unit 3 includes a display and other components and receives the temperature signals to display the temperature on the display.

The temperature calculator 2 and the temperature display unit 4 are not necessarily provided near the infrared detectors 1 and 1' and may be disposed at any desired positions as long as they are wired or wirelessly connected.

In addition, a temperature control device (not illustrated) that receives the temperature signals and controls the temperature of the object may be prepared and the radiation thermometer 100 and the temperature control device may constitute a temperature measurement control system.

The following specifically describes an example of a method of calculating the temperature of the measurement target region Xa by the temperature calculator 2.

The value of the detection signals output from the sensor elements 11 and 11' (hereinafter referred to as the amount of detected infrared rays) is the sum of the value obtained by multiplying the temperature of the measurement target region Xa by the ratio of the area occupied by the measurement target region Xa to the measurement visual fields Vf and Vf' and the value obtained by multiplying the temperature of the surrounding region (heat transfer block Y) by the ratio of the area occupied by the surrounding region to the measurement visual fields Vf and Vf', respectively.

The measurement visual field is one of visual field characteristics (consisting of various indicators indicating what kind of visual field the radiation thermometer has) and indicates the size of a target size set as a measurement target at a certain measurement distance by the radiation thermometer. Typically, the measurement visual field is determined to be a diameter equivalent to 90% of the total incident energy.

Spectral radiant energy of a black body with a temperature T at a wavelength λ is defined as E(λ,T). When the temperature of the measurement target region Xa is $T_1$, the temperature of the surrounding region is $T_2$, the spectral radiant energy from the measurement target region Xa to the sensor element 11 of the first infrared detector 1 having a sensitivity of wavelength $\lambda_1$ is $E(\lambda_1,T_1)=E_1(T_1)$, the spectral radiant energy from the surrounding region is $E(\lambda_1,T_2)=E_1(T_2)$, the ratio of the amount of incident light (area ratio) occupied by the measurement target region Xa to the measurement visual field Vf of the infrared detector 1 is $R_1$, the spectral radiant energy from the measurement target region Xa to the sensor element 11' of the second infrared detector 1' having a sensitivity at wavelength $\lambda_2$ is $E(\lambda_2,T_1)=E_2(T_1)$, the spectral radiant energy from the surrounding region is $E(\lambda_2,T_2)=E_2(T_2)$, the ratio of the amount of incident light (area ratio) occupied by the measurement target region Xa to the measurement visual field Vf' of the infrared detector 1' is $R_2$, the spectral radiant energy incident on the sensor element 11 of the first infrared detector 1 is $W_1$, and the spectral radiant energy incident on the sensor element 11' of the second infrared detector 1' is $W_2$, the following expressions are satisfied if emissivity and other coefficients are omitted:

$$W_1 = R_1 \cdot R_1(T_1) + (1-R_1) \cdot E_1(T_2) \tag{1}$$

$$W_2 = R_2 \cdot R_2(T_1) + (1-R_2) \cdot E_2(T_2) \tag{2}$$

If $\lambda_1 = \lambda_2$, that is, if $E_1(T_1)=E_2(T_1)$ and $E_1(T_2)=E_2(T_2)$ are satisfied, $T_1$ is expressed by:

$$E_1(T_1) = [(1-R_2) \cdot W_1 - (1-R_1) \cdot W_2]/(R_1-R_2)$$

$$T_1 = E^{-1}([(1-R_2) \cdot W_1 - (1-R_1) \cdot W_2]/\{R_1-R_2\}) \tag{3}$$

If $\lambda_1 \neq \lambda_2$, that is, if $E_1(T_1) \neq E_2(T_1)$ and $E_1(T_2)=E_2(T_2)$ are satisfied, $$T_2 = E_1^{-1}([W_1 - R_1 \neq E_1(T_1)]/\{1-R_1\})$$

$$T_2 = E_2^{-1}([W_2 - R_2 \neq E_2(T_1)]/\{1-R_2\})$$

are satisfied, and $$E_1^{-1}([W_1 - R_1 \cdot E_1(T_1)]/\{1-R_1\}) = E_2^{-1}([W_2 - R_2 \cdot E_2(T_1)]/\{1-R_2\}) \tag{4}$$

is derived.

$T_1$ satisfying Expression (4) is solved by the bisection method or the like.

The temperature calculator 2 stores Expressions (3) and (4) and the known values $R_1$ and $R_2$ in the memory. The temperature calculator 2 calculates the temperature $T_1$ of the measurement target region Xa by substituting the values $W_1$ and $W_2$ of the detection signals obtained by the infrared detectors 1 and 1' and the values $R_1$ and $R_2$ into Expressions (3) and (4).

With this configuration, as is clear from the fact that $T_2$ is not present in Expression (3) or (4), the temperature of the measurement target region Xa can be measured independently of the temperature of regions other than the measurement target region Xa. Consequently, the present embodiment can accurately measure the temperature without being affected by a temporal change in temperature of the other regions and a positional temperature gradient at all.

The first embodiment may have various modifications.

Figure 4:
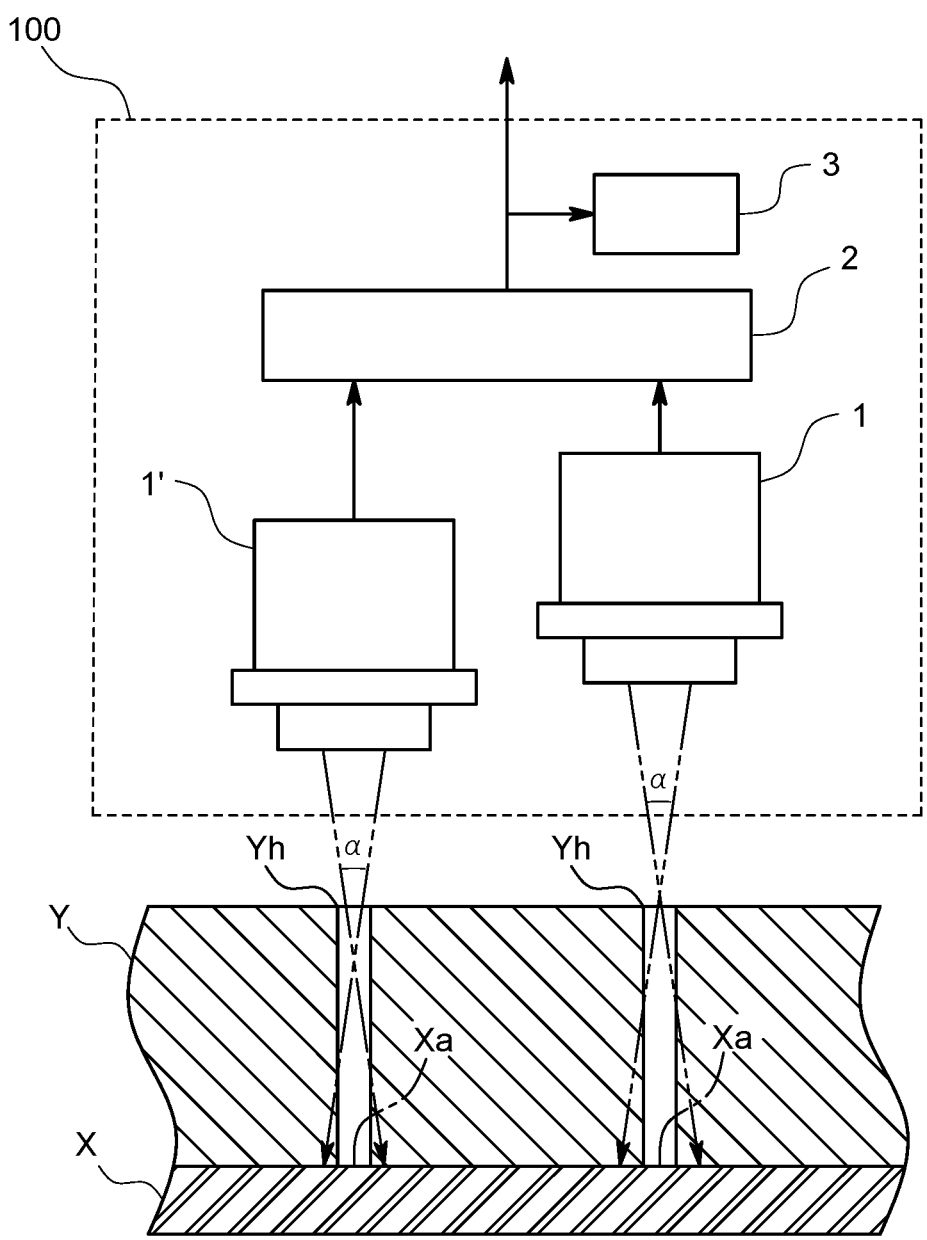
FIG. 4 is an overall schematic of the radiation thermometer according to a modification of the embodiment.

The embodiment described above, for example, makes the viewing angles α and α' of the infrared detectors 1 and 1' different to vary the ratio of the area occupied by the temperature measurement target region Xa to the measurement visual fields Vf and Vf' between the infrared detectors 1 and 1'. The embodiment, however, may vary the distance between the temperature measurement target region Xa and the infrared detectors 1 and 1' at the same viewing angle α as illustrated in FIG. 4.

The infrared detectors 1 and 1' may differ from each other in the viewing angle and the distance.

Figure 5:
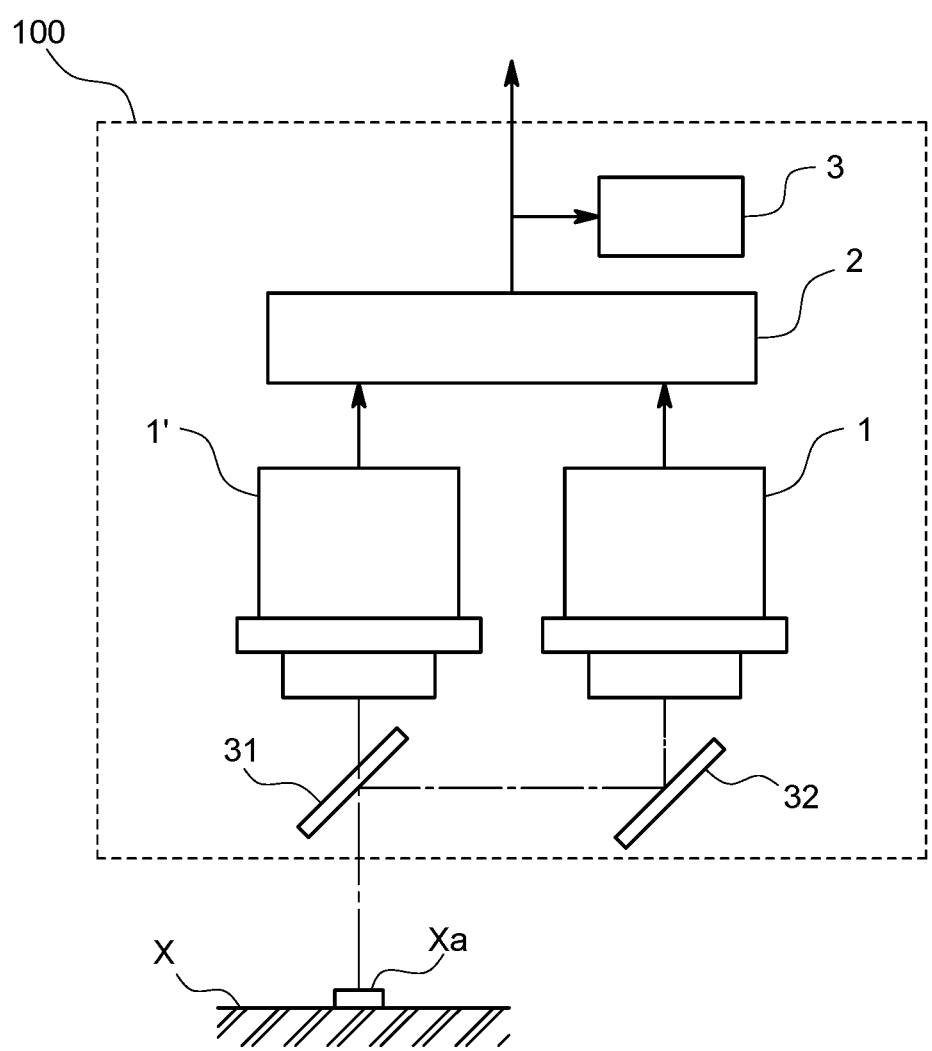
FIG. 5 is an overall schematic of the radiation thermometer according to another modification of the embodiment.

The embodiment described above has the two identical measurement target regions Xa having the same surrounding conditions so as to correspond to the two infrared detectors 1 and 1' having different visual field characteristics. If there is one measurement target region Xa as illustrated in FIG. 5, for example, a beam splitter 31 may be prepared to divide the infrared rays into two parts and introduce them into the respective infrared detectors 1 and 1'. The viewing angles of the infrared detectors 1 and 1' are the same in this case, but the distances (optical path lengths) between the temperature measurement target region Xa and the infrared detectors 1 and 1' are different as described above. Reference sign 32 denotes a mirror.

More specifically, the present invention can also be embodied with a single infrared detector. For example, a zoom mechanism capable of adjusting the position of the lens of the optical system may be prepared to perform measurement twice at predetermined time intervals and vary the magnification/reduction rate of the zoom mechanism (ratio of the area occupied by the temperature measurement target region to the measurement visual field in each measurement) for each measurement.

More specifically, in the first measurement, a first measurement visual field including the measurement target region is set by adjusting the zoom mechanism and the amount of infrared rays incident from the first measurement visual field is detected. In the second measurement, a second measurement visual field including the measurement target region and having a size different from that of the first measurement visual field with respect to the measurement target region is set by adjusting the zoom mechanism and the amount of infrared rays incident from the second measurement visual field is detected.

After obtaining the amounts of infrared rays from the two different measurement fields in this manner, the temperature of the measurement target region may be calculated by the same method as that described in the embodiment above.

This method can be carried out not only by using the optical system, but for example also by changing a distance between the infrared detector and the temperature measurement target region with a distance adjustment mechanism prepared to adjust the distance.

Figure 6:
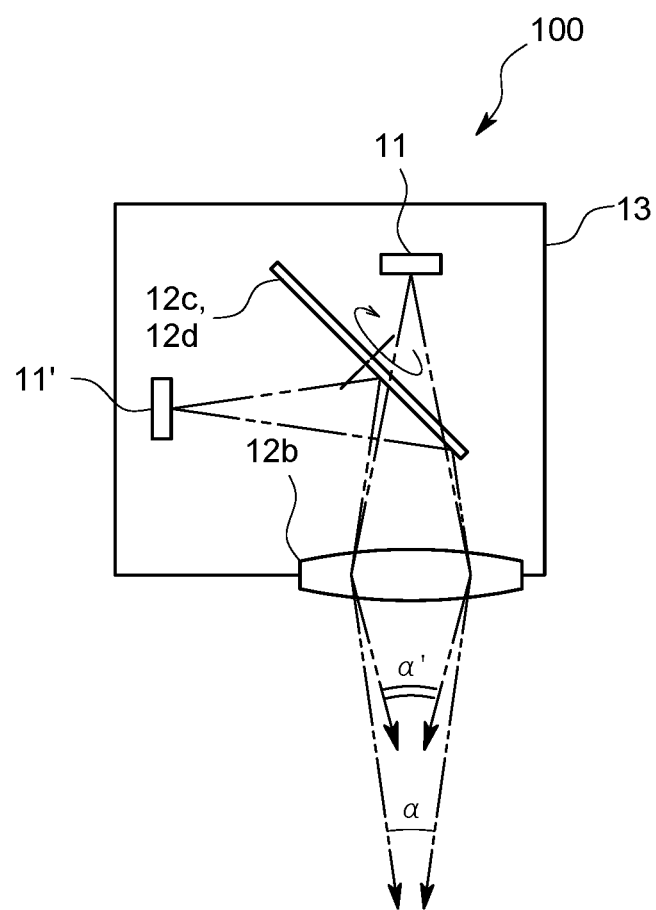
FIG. 6 is an overall schematic of the radiation thermometer according to another modification of the embodiment.
Figure 7:
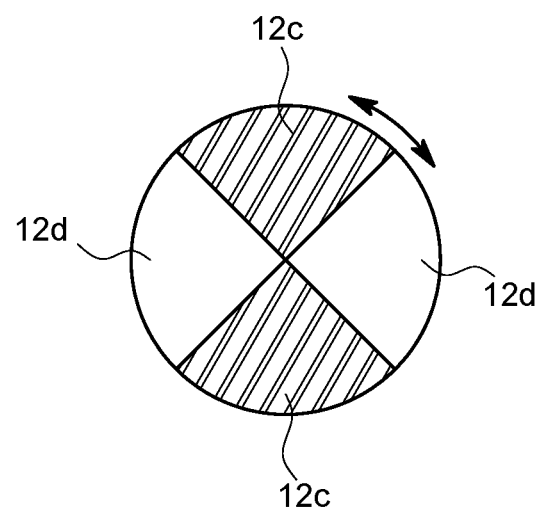
FIG. 7 is a schematic of a mirror and a translucent plate according to the modification.

The radiation thermometer 100 may be the one illustrated in FIG. 6. This radiation thermometer 100 includes two sensor elements 11 and 11' (corresponding to infrared detectors in the claims) in a single housing. The lens 12b is shared by the sensor elements 11 and 11', and one of a mirror 12c and a translucent plate 12d can be selectively disposed on the optical path of the infrared rays incident from the lens 12b. More specifically, the mirror 12c and the translucent plate 12d are alternately formed on a single disc in this example as illustrated in FIG. 7. By rotating the disc, one of the mirror 12c and the translucent plate 12d is disposed on the optical path.

When the translucent plate is selected, one sensor element 11 is enabled, that is, the infrared rays emitted from the measurement target region are incident on the sensor element 11. When the mirror is selected, the other sensor element 11' is enabled, that is, the infrared rays emitted from the measurement target region are incident on the sensor element 11'.

Consequently, by making the optical path lengths from the lens 12b to the respective sensor elements 11 and 11 different, and the size of the measurement visual field of the sensor element 11 and the size of the measurement visual field of the sensor element 11' (to be precise, the ratio of the area occupied by the temperature measurement target region to the measurement visual field)' are different.

The measurement procedure in this example needs to be performed twice similarly to the example using the zoom mechanism. This procedure includes the first measurement with the mirror 12c and the second measurement with the translucent plate 12d.

Figure 8:
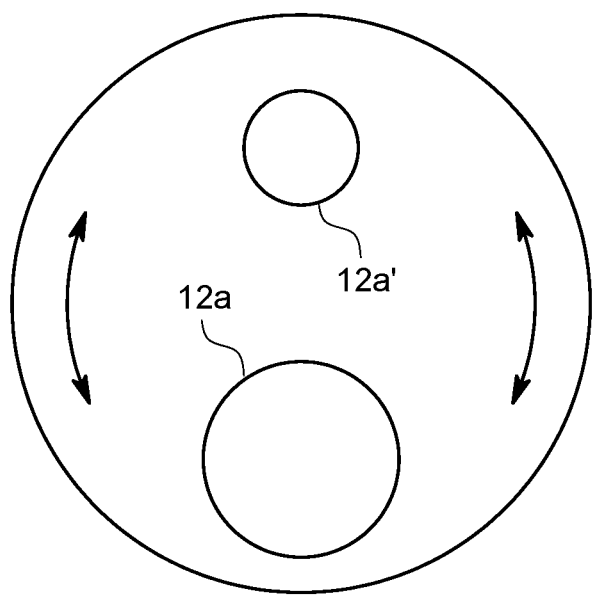
FIG. 8 is a schematic of apertures according to still another modification of the embodiment.

The measurement visual field can also vary by changing the diameter of the aperture in the optical system. If two infrared detectors are provided, the measurement visual fields can vary by changing the diameters of the apertures without changing the lens powers or the optical path lengths. If a single infrared detector is provided, two apertures having different diameters may be prepared in a movable manner such that one of the apertures can be used. In FIG. 8, for example, two apertures having different diameters are provided to a disc, and one of the apertures can be selectively used by rotating the disc. The aperture diameter may be changed not only by rotating the disc, but also by selecting the aperture through sliding movement or using an aperture variable mechanism.

The temperature calculation routine by the temperature calculator is not only used as described in the embodiment above, but may also be used to, for example, calculate the temperature of the measurement target region using simultaneous equations or calculate the temperature of the measurement target region based on a temperature map created in advance by an experiment.

Three or more infrared detectors each having a different size of the measurement visual field may be provided.

Figure 9:
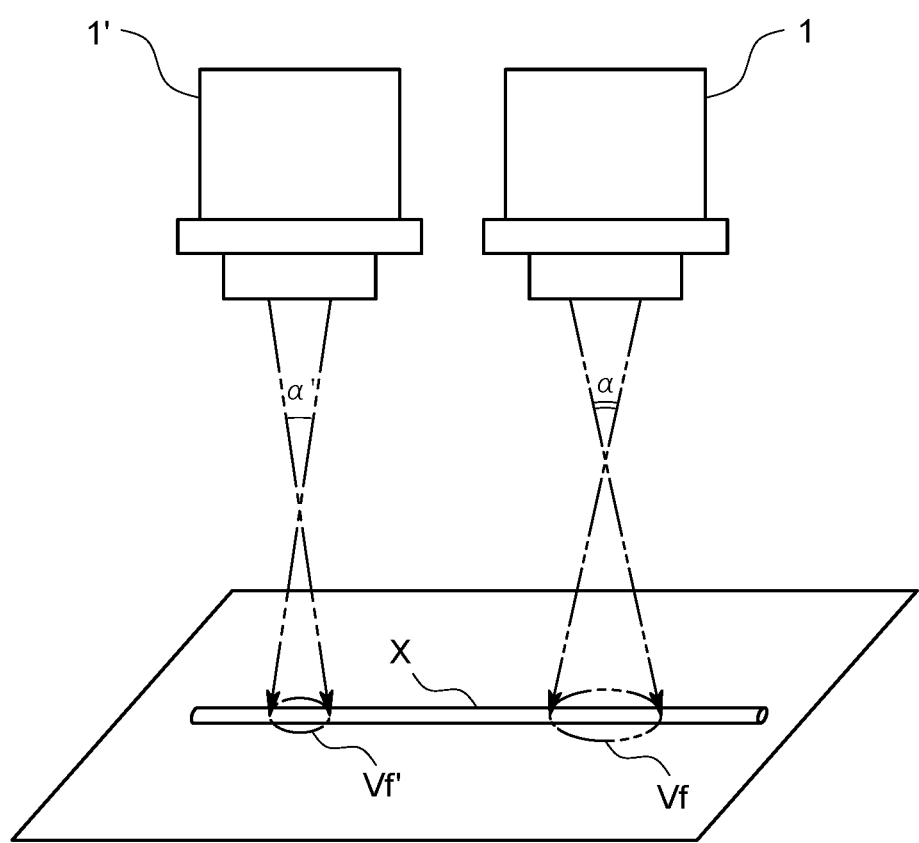
FIG. 9 is an overall schematic of the radiation thermometer according to another modification of the embodiment.

As illustrated in FIG. 9, the object X may be a linear object, such as a wire. In this illustrated example, the object X has an equal temperature at any part, including the surrounding region. For this reason, the radiation thermometer 100 according to this example also includes the pair of infrared detectors 1 and 1' and measures the two parts of the object X, considering that the parts have the same temperature, similarly to the embodiment above. This example also makes the measurement visual fields Vf and Vf' of the respective infrared detectors 1 and 1' different to vary the ratio of the area occupied by the object X (measurement target region) to the measurement visual fields Vf and Vf'.

Also this configuration can accurately measure the temperature of the object X if the ratio of the area occupied by the measurement target object (measurement target region) to the measurement visual fields Vf and Vf' are known.

Second Embodiment

A second embodiment of the present invention is described below.

Figure 10:
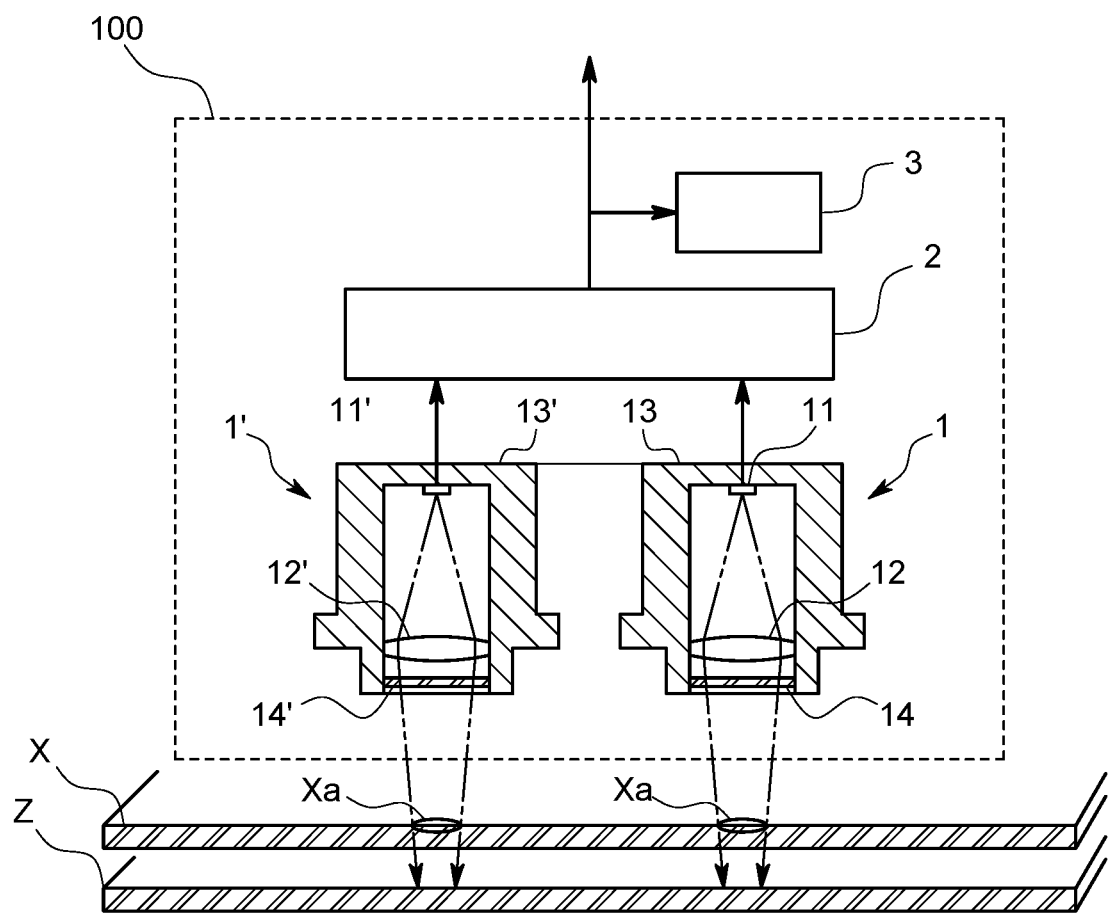
FIG. 10 is an overall schematic of a radiation thermometer according to a second embodiment of the present invention.

As illustrated in FIG. 10, the radiation thermometer 100 according to the present embodiment measures the temperature of the measurement target region Xa in the object X in a non-contact manner. The radiation thermometer 100 includes the pair of infrared detectors 1 and 1', the temperature calculator 2, and the temperature display unit 3. The pair of infrared detectors 1 and 1' detects infrared rays emitted from the object X. The temperature calculator 2 calculates the temperature of the measurement target region Xa based on the amount of detected infrared rays that is the amounts of infrared rays detected by the respective infrared detectors 1 and 1'.

As illustrated in FIG. 10, the object X has low emissivity (high transmittance) in the wavelength band of infrared rays detectable by the infrared detectors 1 and 1' (hereinafter referred to as a detectable infrared wavelength band), and there can be infrared rays that are emitted from a body Z in the background, passing through the object X, and incident on the infrared sensors.

The following describes the radiation thermometer 100.

Similarly to the first embodiment, the pair of infrared detectors 1 and 1' includes the sensor elements 11 and 11', the optical systems 12 and 12', and the housings 13 and 13', respectively, as illustrated in FIG. 10. The sensor elements 11 and 11', such as thermopiles, detect infrared rays. The optical systems 12 and 12' are disposed in front of the sensor elements 11 and 11', respectively. The housings 13 and 13' house the sensor elements 11 and 11' and the optical systems 12 and 12', respectively.

Consequently, the infrared detectors 1 and 1' have the same sensor elements 11 and 11', the same optical systems 12 and 12', and the same housings 13 and 13', respectively, and their viewing angles are equal. The distances between the temperature measurement target region Xa and the respective infrared detectors 1 and 1' are also set to be equal.

The infrared detectors 1 and 1' according to the second embodiment further include optical filters 14 and 14', respectively, in front of or behind the optical systems. The optical filters 14 and 14' have transmittable infrared wavelength bands different from each other. As a result, the wavelength bands of infrared rays detectable by the infrared detectors 1 and 1' (a first detectable infrared wavelength band and a second detectable infrared wavelength band) are made different from each other. The term "being different from each other" herein includes the case where the wavelength bands partially overlap. In other words, the wavelength bands simply need to be not identical perfectly.

The measurement target regions Xa of the infrared detectors 1 and 1' are identical (while they are different parts of the object X in FIG. 10, they are considered to be identical).

The temperature calculator 2 calculates the temperature of the measurement target region Xa based on the values of detection signals output from the infrared detectors 1 and 1' (a first amount of detected infrared rays and a second amount of detected infrared rays).

The principle of the calculation is as follows.

The total amount of infrared rays in a certain wavelength band incident on the infrared detectors 1 and 1' is the sum of infrared rays A1 from the measurement target region Xa, infrared rays A2 from behind the measurement target region Xa, and infrared rays A3 reflected by the measurement target region Xa. If the radiation thermometer and the measurement target region directly face each other, A3 is known because it is infrared rays emitted from the radiation thermometer 100. Consequently, the ratio of A1 to A2, that is, R=A1/A2 corresponds to emissivity/transmittance of the measurement target region Xa.

The ratio R is known.

The temperature calculator 2 calculates the object temperature from data in two different wavelength bands, that is, the first amount of detected infrared rays and the second amount of detected infrared rays and from the known ratios $R_1$ and $R_2$ in the wavelength bands described above by simultaneous equations, the bisection method, and the like.

The following describes a specific example of calculation.

When the spectral radiation energy from the measurement target region Xa to the infrared detector 1 is $E_1(T_X)$, the spectral radiation energy from the background of the measurement target region Xa to the infrared detector 1 is $E_1(T_{background})$, the spectral radiation energy from the measurement target region Xa to the infrared detector 1' is $E_2(T_X)$, and the spectral radiation energy from the background of the measurement target region Xa to the second infrared detector 1' is $E_2(T_{background})$, the spectral radiation energy (first amount of detected infrared rays) $W_1$ detected by the first infrared detector 1 is expressed by:

$$W_1 = R_1 \cdot E_1(T_X) = (1-R_1) \cdot E_1(T_{background}) \qquad (5)$$

the spectral radiation energy $W_2$ detected by the second infrared detector 1' is expressed by:

$$W_2 = R_2 \cdot E_2(T_X) + (2-R_2) \cdot E_1(T_{background}) \qquad (6)$$

There are two unknown parameters $T_X$ and $T_{background}$. Consequently, the following expression is derived using Expressions (5) and (6):

$$E_1^{-1}((W_1 - R_1 \cdot E_1(T_X))/1 - R_1)) = E_2^{-1}((W_2 - R_2 \cdot E_2(T_X))/(1-R_2)) \qquad (7)$$

There is a single solution satisfying Expression (7) because the relation E(T) between spectral radiation energy and temperature monotonically increases. Consequently, the object temperature $T_X$ can be calculated.

The second embodiment having the configuration described above can reliably eliminate effects of a non-target object that emits infrared rays passing through the measurement visual field if the non-target object is present in the background of the measurement target region Xa and the temperature of the non-target object changes.

It should be noted that Japanese Patent Application Laid-open No. H10-38696 describes a configuration that eliminates effects of the temperature of a non-target object using infrared sensors having two wavelength bands. This literature, however, principally does not eliminate the effects of infrared rays passing through the measurement target region and calculates the effects of the temperature of the non-target object based only on the ratio of output from the infrared sensors, so that an error occurs in measuring the temperature of the measurement target region if the temperature of the non-target object fluctuates.

The second embodiment may also have various modifications.

For example, the bisection method as described in the first embodiment may be used to calculate the temperature. Alternatively, the temperature of the measurement target region may be calculated based on a correlation expression created in advance by an experiment.

Figure 11:
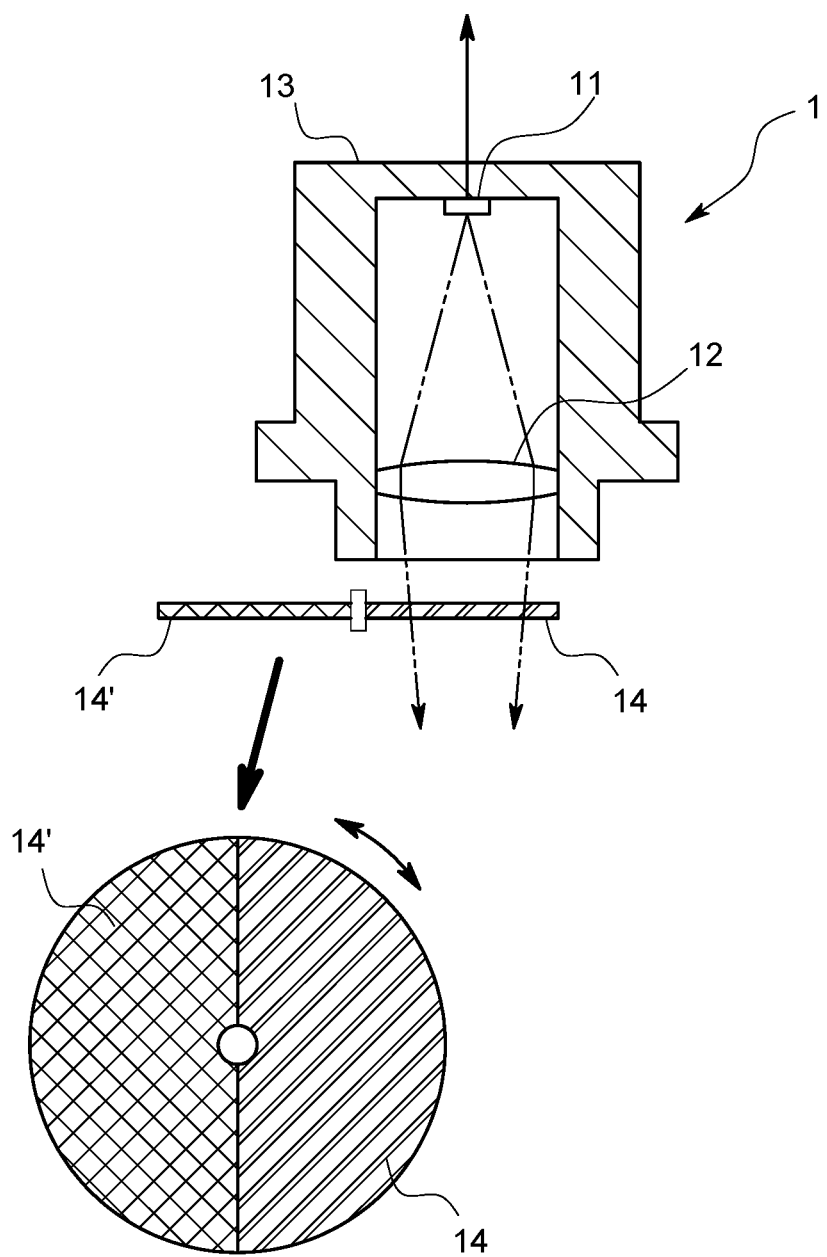
FIG. 11 is a schematic of the internal structure of infrared detectors according to a modification of the embodiment.

The present invention can also be embodied with a single infrared detector 1. As illustrated in FIG. 11, for example, a movement mechanism is provided to selectively move, onto the optical path, one of the optical filters 14 and 14' having transmittable infrared wavelength bands different from each other, the first optical filter 14 is used in the first measurement, and the second optical filter 14' is used in the second measurement performed after a predetermined time has elapsed since the first measurement. After obtaining the amounts of infrared rays in the two measurements, the temperature of the measurement target region may be calculated by the same method as that described in the embodiment above. While a rotary disc is used in the movement mechanism in this example, a sliding mechanism or other mechanisms may be used.

The number of optical filters is not limited to two and may be three or more. Similarly, three or more infrared detectors having different detectable infrared wavelength bands may be used.

Third Embodiment

A third embodiment of the present invention is described below.

Figure 12:
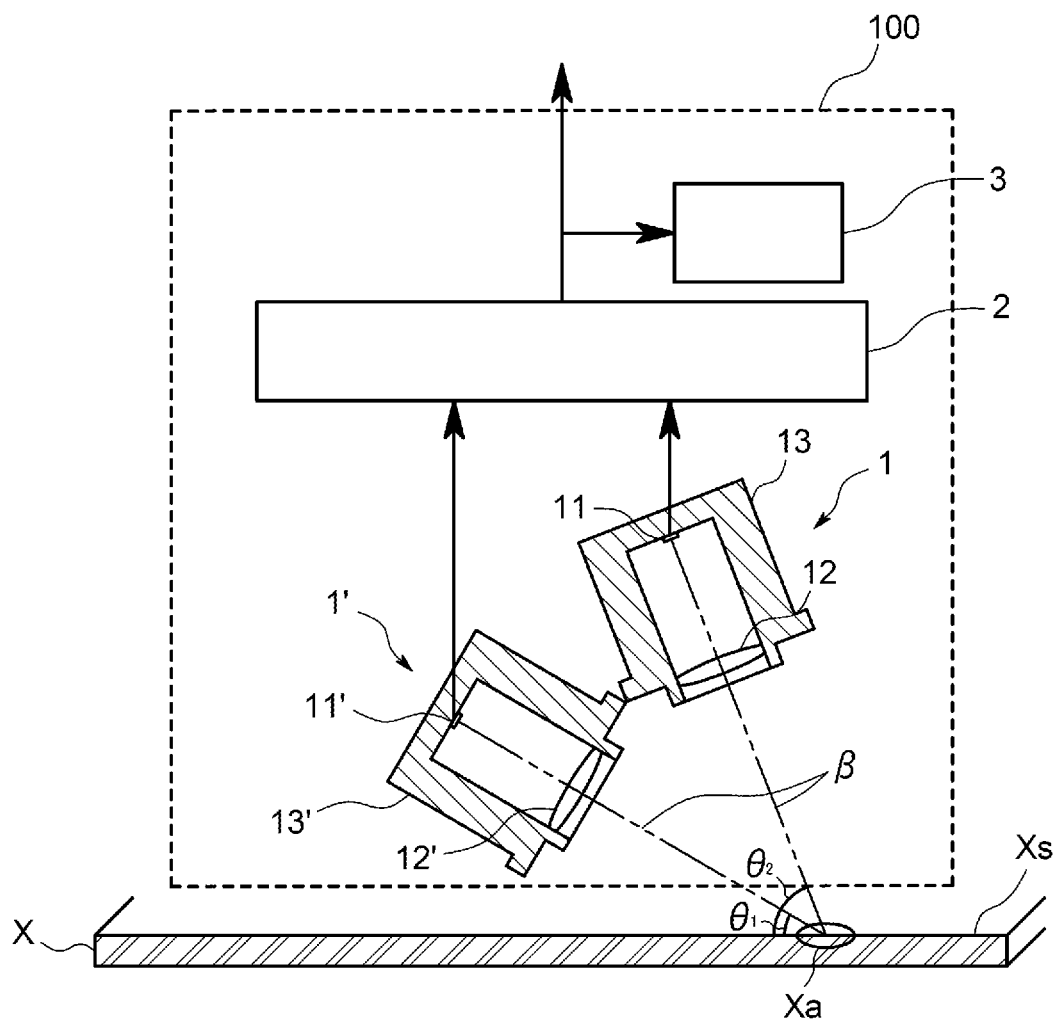
FIG. 12 is an overall schematic of a radiation thermometer according to a third embodiment of the present invention.

As illustrated in FIG. 12, the radiation thermometer 100 according to the present embodiment measures the temperature of the measurement target region Xa in the object X in a non-contact manner. The radiation thermometer 100 includes the pair of infrared detectors 1 and 1', the temperature calculator 2, and the temperature display unit 3. The pair of infrared detectors 1 and 1' detects infrared rays emitted from the object X. The temperature calculator 2 calculates the temperature of the measurement target region Xa based on the amount of detected infrared rays that is the amounts of infrared rays detected by the respective infrared detectors 1 and 1'. The object X has a transmittance of 0.

The following describes the radiation thermometer 100.

Similarly to the first embodiment, the pair of infrared detectors 1 and 1' includes the sensor elements 11 and 11', the optical systems 12 and 12', and the housings 13 and 13', respectively, as illustrated in FIG. 12. The sensor elements 11 and 11', such as thermopiles, detect infrared rays. The optical systems 12 and 12' are disposed in front of the sensor elements 11 and 11', respectively. The housings 13 and 13' house the sensor elements 11 and 11' and the optical systems 12 and 12', respectively. The infrared detectors 1 and 1' have measurement optical axes β, which are the optical axes of the respective optical systems 12 and 12', respectively. The measurement visual field has the size of the target size set as the measurement target by the radiation thermometer and defined based on the measurement optical axis β.

Consequently, the infrared detectors 1 and 1' have the same sensor elements 11 and 11', the same optical systems 12 and 12', and the same housings 13 and 13', respectively, and their viewing angles are equal. The optical path lengths on the measurement optical axes β between the temperature measurement target region Xa and the respective infrared detectors 1 and 1' are also set to be equal. In addition, the points of intersection of the measurement optical axes β of the respective infrared detectors 1 and 1' with the surface of the measurement target region Xa are also identical. By contrast, the angles of the measurement optical axes β of the respective infrared detectors 1 and 1' to an object surface Xs are set to be different from each other.

The temperature calculator 2 calculates the temperature of the measurement target region Xa based on the values of detection signals output from the infrared detectors 1 and 1' (the first amount of detected infrared rays and the second amount of detected infrared rays) and on the reflectance or the emissivity at each of the angles.

The principle of the calculation is as follows.

When an angle θ of the measurement optical axis β to the object surface Xs changes, reflectance R and emissivity ε also change. For this reason, spectral radiation energies W incident on the infrared detectors 1 and 1' are different from each other.

The temperature calculator 2 calculates the object temperature from data at different angles, that is, the first amount of detected infrared rays and the second amount of detected infrared rays and from one or both of known reflectances $R(\theta_1)$ and $R(\theta_2)$ and known emissivities $\varepsilon(\theta_1)$ and $\varepsilon(\theta_2)$ at the angles $\theta_1$ and $\theta_2$ by simultaneous equations, the bisection method, and the like.

The following describes a specific example of calculation.

When the spectral radiation energy from the measurement target region Xa to the infrared detector 1 is $E_1(T_X)$, the spectral radiation energy that is emitted from the surrounding region, reflected by the surface of the measurement target region Xa, and incident on the infrared detector 1 is $E_1(T_R)$, the spectral radiation energy from the measurement target region Xa to the infrared detector 1' is $E_2(T_X)$, and the spectral radiation energy that is emitted from the surrounding region, reflected by the surface of the measurement target region Xa, and incident on the second infrared detector 1' is $E_2(T_R)$, the spectral radiation energy (first amount of detected infrared rays) $W_1$ detected by the first infrared detector 1 is expressed by:

$$W_1 = \varepsilon(\theta_1) \cdot E_1(T_X) + (1 - \varepsilon(\theta_1)) \cdot E_1(T_R) \tag{8}$$

the spectral radiation energy (second amount of detected infrared rays) $W_2$ detected by the second infrared detector 1' is expressed by:

$$W_2 = \varepsilon(\theta_2) \cdot E_2(T_X) + (1 - \varepsilon(\theta_2)) \cdot E_2(T_R) \tag{9}$$

If $E_1(T_X) = E_2(T_X) = E(T_X)$ and $E_1(T_R) = E_2(T_R) = E(T_R)$ are satisfied, there are two unknown parameters $E(T_X)$ and $E(T_R)$. Consequently, the following expression is derived using Expressions (8) and (9):

$$T_X = E^{-1}(((1-\varepsilon(\theta_2)) \cdot W_1 - (1-\varepsilon(\theta_1)) \cdot W_2)/(\varepsilon_1 - \varepsilon_2)) \tag{10}$$

As a result, the object temperature $T_X$ can be calculated.

If $E_1(T_X) \neq E_2(T_X)$ and $E_1(T_R) \neq E_2(T_R)$ are satisfied, the object temperature fails to be calculated by simultaneous equations. It is necessary to use the bisection method or the like.

With the third embodiment having the configuration described above, as is clear from the fact that $T_R$ is not present in Expression (10), the temperature of the measurement target region Xa can be measured independently of the temperature of regions other than the measurement target region Xa. Consequently, the third embodiment can accurately measure the temperature without being affected by a temporal change in temperature of the other regions and a positional temperature gradient at all.

The third embodiment may also have various modifications.

For example, the bisection method as described in the first embodiment may be used to calculate the temperature. Alternatively, the temperature of the measurement target region may be calculated based on a correlation expression created in advance by an experiment.

The present invention can also be embodied with a single infrared detector 1. For example, an angle adjusting mechanism is prepared to mechanically move the infrared detector 1 to adjust the angle of the measurement optical axis β to the object surface Xs, the first measurement is performed at a certain angle, and the second measurement is performed at an angle different from the certain angle. After obtaining the amounts of infrared rays in the two measurements, the temperature of the measurement target region may be calculated by the same method as that described in the embodiment above. In addition, the points of intersection of the measurement optical axes β with the surface of the object Xs need not be exactly identical. The points of intersection of the measurement optical axes β with the object Xs simply need to be set such that the measurement target region Xa is included in the measurement visual field at each angle θ, for example.

While the sensor elements, the optical systems, the housings, the viewing angles, and other components constituting the infrared detectors are the same in the third embodiment, they may differ between the detectors. In addition, the optical path lengths of infrared rays detected by the infrared detectors are not necessarily the same. In other words, the respective infrared detectors simply need to detect infrared rays, in a state in which reflectances of infrared rays reflected by the measurement target region of the respective infrared detectors are different. If the reflectance of infrared rays in the measurement target region differs depending on the wavelength of the infrared rays, for example, the infrared detectors simply need to be able to detect different wavelengths. With this configuration, the temperature can be accurately calculated by the temperature calculation method described in the third embodiment even if the angles between the measurement optical axes of the respective infrared detectors and the measurement target region are the same.

Three or more infrared detectors each having a different angle may be provided.

Part or the whole of the configuration according to the first to the third embodiments can be combined.

Part of the configurations according to the embodiments and the modifications described above may be appropriately combined or transformed without departing from the spirit of the present invention.

INDUSTRIAL APPLICABILITY

The present invention can provide a radiation thermometer that can accurately measure the temperature of the measurement target region in a non-contact manner regardless of how the temperature of regions other than the measurement target region changes.

The invention claimed is:

1. A radiation thermometer configured to measure a temperature of a measurement target region in an object, the radiation thermometer comprising:
   two infrared detectors each having a predetermined measurement visual field and configured to detect an amount of infrared rays incident from the measurement visual field; and
   a temperature calculator configured to calculate the temperature of the measurement target region based on the amounts of infrared rays detected by the respective infrared detectors, wherein
   detectable infrared wavelength bands detectable by the respective infrared detectors are different from each other, and
   the temperature calculator calculates the temperature of the measurement target region based further on a ratio between emissivity and transmittance of infrared rays in the measurement target region.

2. The radiation thermometer according to claim 1, wherein the temperature calculator calculates the temperature of the measurement target region based on a ratio of a size of the measurement target region to the measurement visual field of each of the respective infrared detectors besides the amount of infrared rays detected by the respective infrared detectors.

3. The radiation thermometer according to claim 1, wherein
   the infrared detectors each comprise an infrared sensor configured to detect an amount of incident infrared rays and an optical system disposed in front of the infrared sensor and configured to define a viewing angle that is a solid angle of the infrared rays incident on the infrared sensor, and
   distances between the respective infrared detectors and the measurement target region are set to be equal to each other, and the viewing angles of the respective infrared detectors are set to be different from each other.

4. The radiation thermometer according to claim 1, wherein
   the infrared detectors each comprise an infrared sensor configured to detect an amount of incident infrared rays and an optical system disposed in front of the infrared sensor and configured to define a viewing angle that is a solid angle of the infrared rays incident on the infrared sensor, and
   the viewing angles of the respective infrared detectors are set to be equal to each other, and distances between the respective infrared detectors and the measurement target region are set to be different from each other.

5. The radiation thermometer according to claim 1, wherein the infrared detectors each have a predetermined measurement optical axis, and angles of the measurement optical axes to a surface of the object are different from each other.

6. The radiation thermometer according to claim 1, wherein the temperature calculator calculates the temperature of the measurement target region based further on one or both of emissivity and reflectance of infrared rays in the measurement target region.

7. The radiation thermometer according to claim 1, wherein
   the detectable infrared wavelength bands are different from each other, while respective sizes of the measurement visual fields are equal, or
   the reflectances of infrared rays in the measurement target region are set to be different from each other, while the respective sizes of the measurement visual fields are equal.

8. A temperature measurement method for measuring a temperature of a measurement target region in an object, the temperature measurement method comprising:
   calculating the temperature of the measurement target region based on the amounts of multiple infrared rays, and
   setting a predetermined measurement visual field including the measurement target region; and detecting an amount of infrared rays incident from the measurement visual field in a predetermined first detectable infrared wavelength band and detecting the amount of infrared rays in a second detectable infrared wavelength band different from the first detectable infrared wavelength band, wherein
   calculating the temperature of the measurement target region is further based on a ratio between emissivity and transmittance of infrared rays in the measurement target region.

9. The temperature measurement method according to claim 8, wherein a measurement optical axis is set to have a first angle to a surface of the object to cause the infrared rays to be reflected by the measurement target region with the first reflectance, and a measurement optical axis is set to have a second angle different from the first angle to the surface of the object to cause the infrared rays to be reflected by the measurement target region with the second reflectance.

10. A non-transitory program recording media that is recorded a temperature measurement program used to measure a temperature of a measurement target region in an object, the temperature measurement program causing a computer to implement a function as a temperature calculator:

the temperature calculator is configured to:

calculate the temperature of the measurement target region based on a first amount of detected infrared rays obtained by detecting an amount of infrared rays incident from a predetermined measurement visual field including the measurement target region in a predetermined first detectable infrared wavelength band and on a second detected amount of infrared rays obtained by detecting the amount of infrared rays in a second detectable infrared wavelength band different from the first detectable infrared wavelength band, wherein calculating the temperature of the measurement target region is further based on a ratio between emissivity and transmittance of infrared rays in the measurement target region.

11. A radiation thermometer configured to measure a temperature of a measurement target region in an object, the radiation thermometer comprising:

two infrared detectors each having a predetermined measurement visual field and configured to detect an amount of infrared rays incident from the measurement visual field; and a temperature calculator configured to calculate the temperature of the measurement target region based on the amounts of infrared rays detected by the respective infrared detectors, wherein the measurement target region is included in the measurement visual fields of the respective infrared detectors, and sizes of the respective measurement visual fields are set to be different from each other with respect to the measurement target region, and the temperature calculator calculates the temperature of the measurement target region based on a ratio of a size of the measurement target region to the measurement visual field of each of the respective infrared detectors besides the amount of infrared rays detected by the respective infrared detectors.

12. A radiation thermometer configured to measure a temperature of a measurement target region in an object, the radiation thermometer comprising:

two infrared detectors each having a predetermined measurement visual field and configured to detect an amount of infrared rays incident from the measurement visual field; and a temperature calculator configured to calculate the temperature of the measurement target region based on the amounts of infrared rays detected by the respective infrared detectors, wherein the measurement target region is included in the measurement visual fields of the respective infrared detectors, and reflectances of infrared rays in the measurement target region of the respective infrared detectors are set to be different from each other.

\* \* \* \* \*